(12) United States Patent
Baur et al.

(10) Patent No.: US 9,599,352 B2
(45) Date of Patent: Mar. 21, 2017

(54) RADIATOR THERMOSTAT

(75) Inventors: Daniel Baur, Niedereschach (DE);
Bernhard Blocher, VS-Schwenningen (DE); Stefan Schwamberger, Losha OT. Hermsdorf (DE)

(73) Assignee: Minebea Co., Ltd., Nagano-ken (JP)

(*) Notice: Subject to any disclaimer, the term of this patent is extended or adjusted under 35 U.S.C. 154(b) by 1384 days.

(21) Appl. No.: 13/431,203

(22) Filed: Mar. 27, 2012

(65) Prior Publication Data

US 2012/0248204 A1    Oct. 4, 2012

(30) Foreign Application Priority Data

Mar. 30, 2011    (DE) .................. 10 2011 015 577

(51) Int. Cl.
| F01P 7/16 | (2006.01) |
|---|---|
| F24D 19/10 | (2006.01) |
| G05D 23/02 | (2006.01) |
| G05D 23/19 | (2006.01) |
| F16K 31/04 | (2006.01) |

(52) U.S. Cl.
CPC ....... F24D 19/1018 (2013.01); G05D 23/023 (2013.01); G05D 23/1925 (2013.01); *F01P 7/16* (2013.01); *F01P 7/165* (2013.01); *F16K 31/042* (2013.01); *F16K 31/046* (2013.01)

(58) Field of Classification Search
CPC ...... F16K 31/04; F16K 31/042; F16K 31/043; F16K 31/046; F16K 31/047; F24D 19/1018; G05D 23/1921
See application file for complete search history.

(56) References Cited

U.S. PATENT DOCUMENTS

| RE24,663 E * | 6/1959 | Markley | ............... F16K 31/046 |
|---|---|---|---|
| | | | 251/129.12 |
| 5,899,082 A * | 5/1999 | Stein | ....................... A61L 9/122 |
| | | | 62/133 |
| 6,321,780 B1 * | 11/2001 | Iwabuchi | ............... F16K 31/04 |
| | | | 137/341 |
| 2011/0034120 A1 * | 2/2011 | Jaiyeola | ................ F24F 11/006 |
| | | | 454/335 |

FOREIGN PATENT DOCUMENTS

| DE | 3414481 | 10/1985 |
|---|---|---|
| DE | 3905414 | 12/1989 |
| DE | 9216040 | 2/1993 |
| DE | 4314143 | 11/1994 |
| DE | 10257082 | 10/2004 |
| DE | 102006031028 | 1/2008 |
| DE | 102009023282 | 9/2010 |
| EP | 1270905 | 1/2003 |

OTHER PUBLICATIONS

DE 3905414 (English translation).*

* cited by examiner

*Primary Examiner* — Jonathan Bradford
(74) *Attorney, Agent, or Firm* — Volpe and Koenig, P.C.

(57) ABSTRACT

A radiator thermostat (1) to be fitted onto a radiator valve (4) is provided. The radiator thermostat (1) has a transmission element (5, 105, 205) that transmits a compressive force to the valve pin (8) of the radiator valve. An electric motor (12) is provided to drive the transmission element (5, 105, 205). The transmission element (5, 105, 205) is preloaded with a counter force (F2) that acts in opposition to the valve force (F1) using a spring (18; 20; 32). Thus, when moving the transmission element (5, 105, 205), the motor (12) has only to overcome the differential force (df).

5 Claims, 9 Drawing Sheets

RADIATOR THERMOSTAT

CROSS-REFERENCE TO RELATED APPLICATIONS

This application claims the benefit of German Patent Application No. 102011015577.5, filed Mar. 30, 2011, which is incorporated herein by reference as if fully set forth.

BACKGROUND

The invention describes a radiator thermostat to be fitted onto a radiator valve having a transmission element for transmitting a compressive force to the radiator valve, having an electric motor for driving the transmission element, having a control for the electric motor and having a power supply.

Radiator valves regulate the amount of heating fluid that flows through a radiator and thus the temperature in the room in which the radiator is located.

The radiator valve is, for example, fixedly disposed on the radiator or in a supply pipe. It is generally disposed in a corner connector that is located between the radiator pipe and the radiator. The valve has a valve seat and a valve disk that fits into the valve seat such that the through flow can be closed. A linear movement of the valve disk makes it possible to regulate the amount of through flow. The valve disk is connected to a linearly moveable guide unit, where a spring presses this guide unit, and thus the valve disk, away from the valve seat. The valve is then open in the neutral position.

A radiator valve control is fitted onto this radiator valve, where either a screw or snap-in connection may be provided. The radiator valve control has an actuator that interacts with the guide unit and thus with the valve disk and can move these parts. Since the valve disk is held open by the spring, the control need only exert a compressive force on the valve pin when the valve is to be closed.

A well-known radiator valve control is a radiator thermostat which has a temperature sensor, a temperature preselection means, a control and an actuator, the control then moving the actuator such that the temperature measured at the temperature sensor substantially corresponds to the pre-selected temperature.

This kind of radiator thermostat can have a purely mechanical construction. To this end, the thermostat has, for example, an expansion element and a transmission pin. The expansion element can be moved with respect to the valve using a knob, which makes it possible to pre-select the temperature. The expansion element changes its length in accordance with the temperature and thus exerts a compressive force via the transmission element on the valve pin.

However, the radiator thermostat may, for example, also be operated electrically. To this end, it has a temperature sensor that is connected to an electronic control unit. Moreover, there is an electric motor that is controlled by the electronic control unit and used to drive a transmission pin. The transmission pin is designed to exert a compressive force on the guide unit of the valve disk.

To pre-select the temperature, a control dial, for example, or a digital control having a display unit may be provided. This kind of electric thermostat generally has a battery or a rechargeable battery to supply it with power.

In order to close the radiator valve, it is necessary to move the transmission pin against the spring resistance of the radiator valve. Since the actuating force required for this is considerable, the electric motor needs a substantial amount of energy. In order to provide the high actuating force, gears are used that, in turn, have high frictional losses, which goes to additionally increase energy consumption.

The electronics also consume energy, although compared to the motor, this is marginal. This means that in the electric radiator thermostats currently found on the market, the batteries only last a few weeks. It is then necessary to change the batteries, which is both time consuming and costly, particularly if there are a large number of radiators.

SUMMARY

The object of the invention is to provide an electric radiator control that requires significantly less energy.

This object has been achieved according to the invention in that the transmission element is preloaded in the direction of the valve.

The valve generally has a spring that applies a force on the guide unit of the valve disk such that the valve is open in the neutral position. According to the invention, the transmission element is now preloaded with a counter force that acts in opposition to the valve force. To move the valve, only a slight force is then needed that corresponds to the differential force resulting from the difference between the valve force and the counter force. The preload can be chosen such that the differential force in the respective operating point is almost zero, thus allowing the valve to move almost without force. Hence, the electric motor needs only low torque and can be given an appropriately economical design. Only very little electrical energy is then needed to move the valve, which means there is low drainage on the power supply and it accordingly lasts longer.

The transmission element can be preloaded, for example, by using a spring.

In an advantageous embodiment of the invention, a first ball bearing is disposed on the transmission element, an eccentric is disposed on the shaft of the electric motor and the circumference of the eccentric is disposed in the inner ring of a second ball bearing. The outer ring of the second ball bearing rolls on the outer ring of the first ball bearing. The outer ring of the second ball bearing rolls on a counter bearing lying opposite the first ball bearing. Except for a sideways movement due to the eccentricity of the eccentric, the shaft of the motor, the rotational axis of the ball bearing and the point of contact on the counter bearing substantially lie on the longitudinal axis of the transmission pin, and the counter bearing is applied with a counter force in the direction of the valve by two tension springs.

In this arrangement, the rotary movement of the electric motor is converted into a linear movement of the transmission pin by the ball bearings and the eccentric, with very little frictional energy being lost. This makes it possible to save additional energy.

In another advantageous embodiment, an eccentric is disposed on the shaft of the electric motor, a first ball bearing is disposed on the transmission element and a second ball bearing is disposed on a moveable counter bearing. The eccentric is essentially disposed between the two ball bearings, so that it rolls on the outer rings of the first and second ball bearing. The shaft of the motor and the rotational axes of the ball bearings lie substantially on the longitudinal axis of the transmission pin. The counter bearing is applied with a counter force in the direction of the valve by at least one spring. Here again, the movement is converted with minimal friction using ball bearings.

In a particularly advantageous embodiment of the invention, the transmission element interacts with the outer ring of an antifriction bearing whose inner ring is disposed on the outside circumference of an eccentric disk. The outer ring of the antifriction bearing is applied with a force in the direction of the transmission element by means of at least one spring. The eccentric disk is preferably disposed on the shaft of the output drive gear of a reduction gear unit. It may, however, be seated directly on the motor shaft of the drive motor. Alternatively, the transmission element may also interact with the bearing bush of a sliding bearing. The eccentric disk then acts as a shaft that is supported in the gliding bearing surface.

In a further embodiment of the invention, the transmission element has a toothed rack, and a toothed wheel is disposed on the shaft of the electric motor, the toothed wheel engaging into the toothed rack and the toothed rack being preloaded in the direction of the valve using a compression spring.

As well as using ball bearings to convert the movement, the transmission element may, for example, be connected to the shaft of the electric motor using a jointed connecting rod and preloaded in the direction of the valve using a compression spring.

A radiator thermostat driven by an electric motor needs a power supply. This is generally realized using a battery or a rechargeable battery.

A radiator thermostat according to the invention, may also have as its power supply a thermoelectric energy converter to convert thermal energy into electrical energy and/or solar cells, and an energy storage unit to store electrical energy. One or more capacitors or batteries or even a combination of these two may be used, for example, as energy storage units.

Because the arrangement according to the invention consumes only a small amount of power, an energy converter of this kind is effectual in collecting sufficient energy over a certain period of time in order to move the motor. This would not be possible in a compact device using conventional drives.

DETAILED DESCRIPTION FOR THE PREFERRED EMBODIMENTS

Figure 1A:
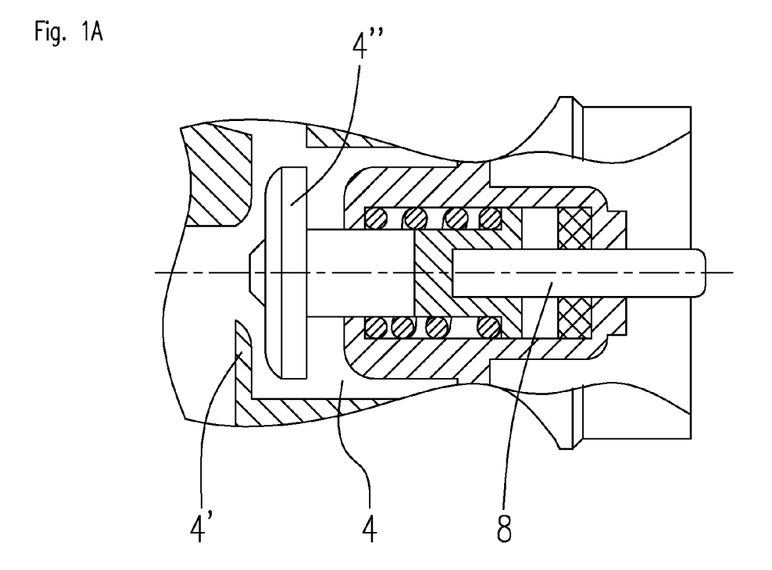
FIG. 1A a cross-section through a radiator valve.
Figure 1B:
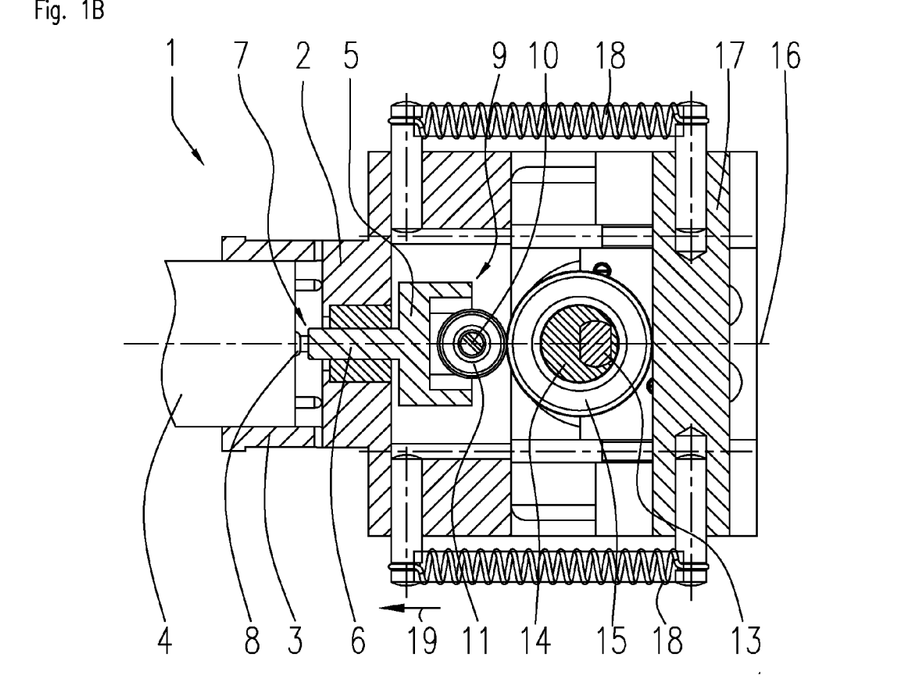
FIG. 1B a cross-section through a radiator thermostat having an eccentric and two ball bearings to transmit the force, FIG. 2 a longitudinal section through the radiator thermostat of FIG. 1*b*, FIG. 3 a cross-section through a radiator thermostat having an alternative arrangement of the eccentric and the two ball bearings, FIG. 4 a longitudinal section through the radiator thermostat of FIG. 3, FIG. 5 a cross-section through a radiator thermostat having a toothed rack on the transmission element and a toothed wheel on the motor shaft, FIG. 6 an oblique view of the radiator thermostat of FIG. 5, FIG. 7 a cross-section through a radiator thermostat having a jointed connecting rod that connects the motor shaft to the transmission element, FIG. 8 an oblique view of the radiator thermostat of FIG. 5, FIG. 9 a radiator thermostat according to FIG. 1*b* having a thermal energy converter as the source of energy, FIG. 10 a cross-sectional view of a further embodiment of a radiator thermostat according to the invention having a thermal energy converter, FIG. 11 a view from above of the radiator thermostat of FIG. 10, FIG. 12 an exploded view of the radiator thermostat of FIG. 10, FIG. 13 the tension spring of the radiator thermostat of FIG. 10, and FIG. 14 the heat sink of the radiator thermostat of FIG. 10.
Figure 2:
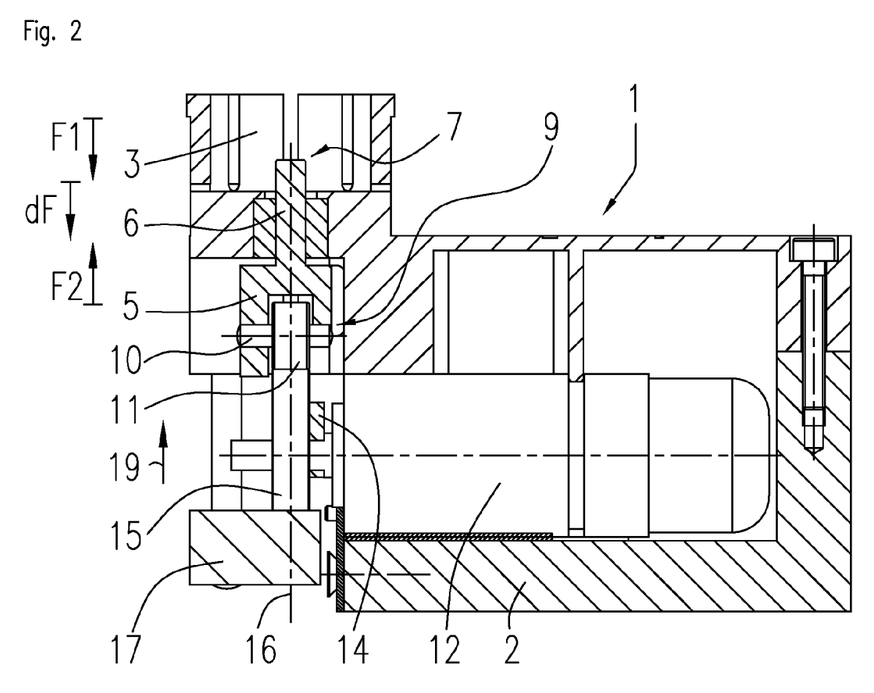

FIGS. 1B and 2 show a first possible embodiment of a radiator thermostat according to the invention that is indicated in its entirety by 1. The radiator thermostat 1 has a housing 2 having a flange 3 with which the housing 2 can be attached to a radiator valve 4. The radiator valve 4 in FIG. 1A has a valve seat 4' and a valve disk 4" that fits into the valve seat 4' such that the through flow can be closed. Through a linear movement of the valve disk 4", the amount of through flow can be regulated. The valve disk 4" is connected to a linearly moveable guide unit in which a spring pushes the guide unit, and thus the valve disk 4", away from the valve seat 4'. The valve is thus open in the neutral position. In the example, the housing 2 is formed in two parts, although the type of housing 2 does not basically affect the function.

The radiator thermostat 1 has a transmission element 5 that has a cylindrical transmission pin 6 at one end. The transmission pin 6 is supported in the housing 2 so as to be linearly moveable and projects from the free end 7 into the flange 3, where it rests against the valve pin 8.

At the inside end 9 of the transmission element 5, an axle 10 is disposed onto which the inner ring of a first ball bearing 11 is firmly fitted.

The radiator thermostat 1 furthermore has an electric motor 12 on whose shaft 13 an eccentric disk 14 is fixed. At the circumference of the eccentric disk 14, the inner ring of a second ball bearing 15 is seated. The two ball bearings are disposed with respect to one another such that the two outer rings roll against one another and that the rotational axes of the ball bearings and of the motor, except for a sideways movement caused by the eccentricity of the eccentric, lie in one line with the longitudinal axis 16 of the transmission pin 6.

On the side of the second ball bearing 15 located opposite the first ball bearing 11, the outer ring of the second ball bearing 15 rests against a counter bearing 17, the contact point lying approximately on the longitudinal axis 16 of the transmission pin 6. The counter bearing 17 is approximately shaped like a beam that extends at a right angle to the longitudinal axis 16. At each of the two lateral ends of the beam 17, a tension spring 18 is disposed that is tensioned on the housing 2 in the direction of the valve flange 3 and applies a force to the counter bearing 17 in the direction of the valve 19.

When the motor 12 is switched on, the eccentric disk 14 rotates with the shaft 13 of the motor 12. Because it is connected to the first ball bearing 11, the transmission pin 6 consequently makes a linear movement in a longitudinal direction. A valve pin 8 connected to the transmission pin 6 is thereby moved, so that the valve 4 opens or closes, depending on the rotational position of the eccentric disk 14.

Two forces act on the transmission element 5 at all times. One is the compressive force F1 of the radiator valve 4 with which the valve pin 8 is tensioned. The spring resistance F2 with which the counter bearing 17 is preloaded acts in opposition to this force F1. Ideally, the two forces have approximately the same strength about the chosen operating point. The opening in the valve 4 is determined by the rotational position of the eccentric 14.

In order to move the transmission pin 6, the electric motor 12 need now only provide the differential force dF=F1−F2 of the two outer forces in each position. This differential force dF increases the more the valve closes. On the one hand, the preload force of the springs 18 decreases in the process, and, on the other hand, an ever increasing counter force has to be overcome because of the spring in the radiator valve. Since this differential force dF is less than it would be without the counter force F2, the motor 12 requires less force and thus less electrical energy.

Moreover, since the rotational movement of the motor is converted into a linear movement of the transmission pin using the eccentric disk 14 and the ball bearings 11, 15, it is practically only rolling friction that occurs here that requires very little extra energy.

Since the motor 12 requires only low torque, a small, economical motor can be used which, moreover, does not need strong reduction gearing.

Taken as a whole, the electric drive is thus very economical compared to the prior art so that a battery, for example, used for the power supply has a considerably longer useful life.

Instead of using the illustrated ball bearings to convert the rotational movement, other bearings such as needle bearings, roller bearings or other types of anti-friction or sliding bearings could also be used.

Figure 3:
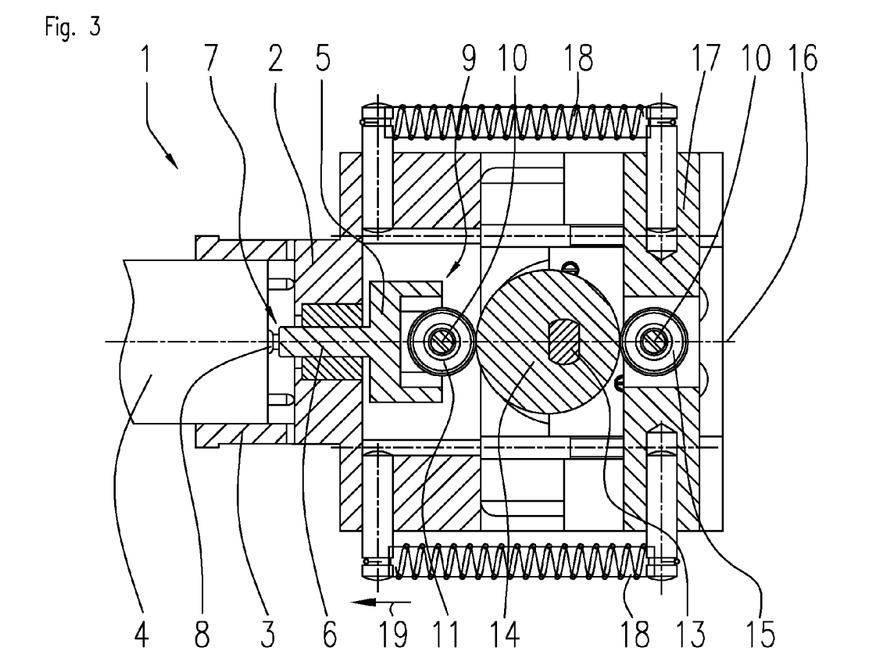
Figure 4:
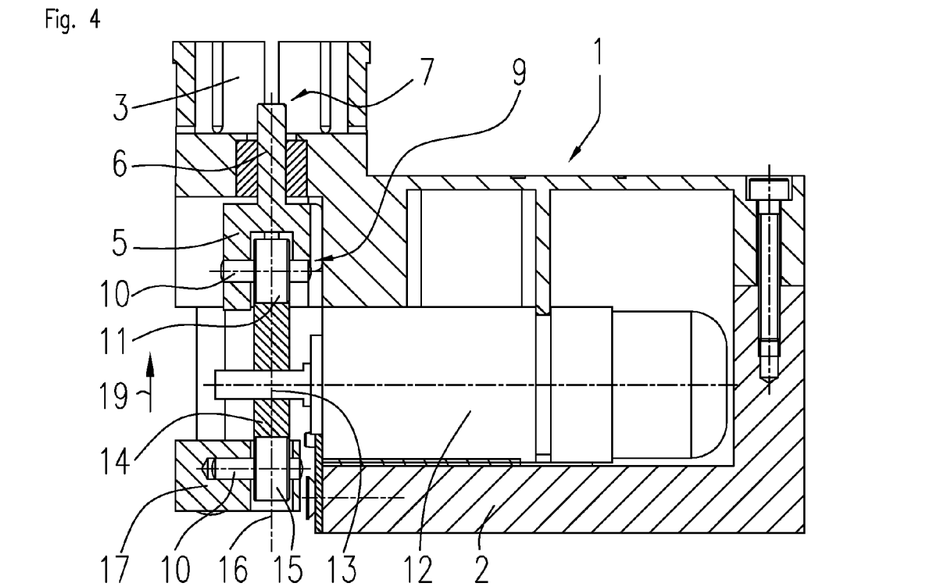

In FIGS. 3 and 4, an alternative embodiment of the invention is shown that is substantially based on the embodiment of FIGS. 1 and 2. Here, however, the second ball bearing 15 is disposed on the counter bearing 17 and the eccentric disk 14 is disposed between the two ball bearings 11 and 15 such that it rolls on the outer rings of the two ball bearings. The rotational axes of the ball bearings and of the motor here again lie on the longitudinal axis 16 of the transmission pin 6. Here, the movement of the transmission pin 6 acts in accordance with the same principle as in the embodiment of FIGS. 1 and 2.

Figure 5:
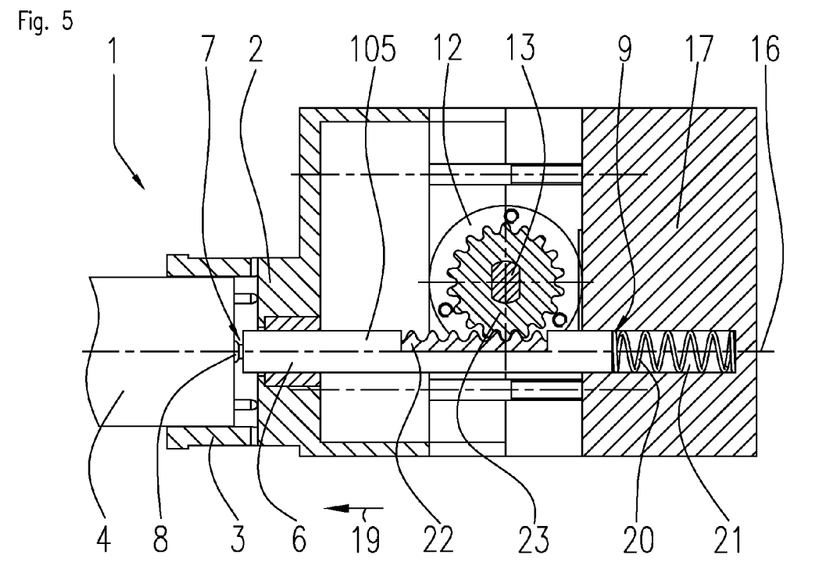
Figure 6:
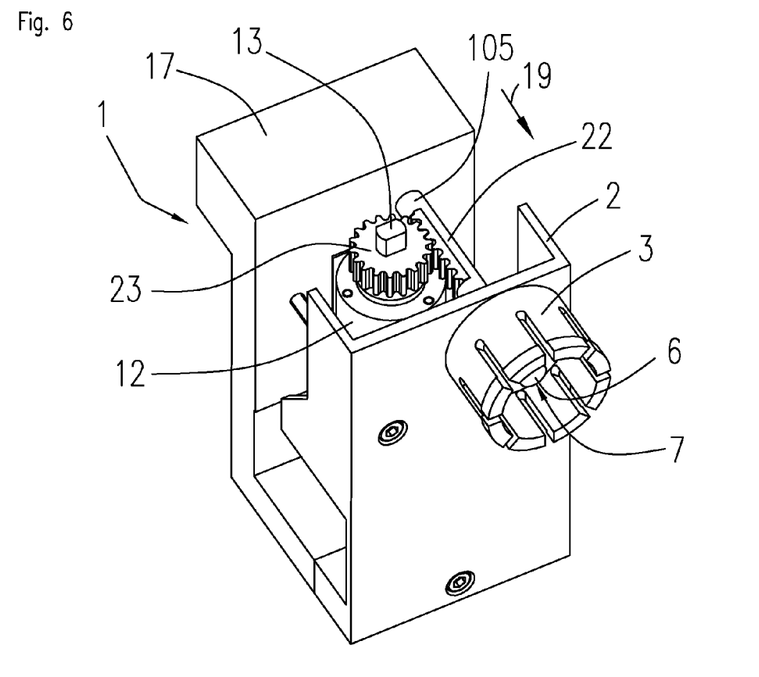

A fundamentally different embodiment is shown in FIGS. 5 and 6. Here, the transmission element 105 is made somewhat longer and, at its inside end 9, is tensioned by a compression spring 20 in the direction of the valve 19. In the example, the compression spring 20 takes the form of a coil spring that is held in a recess 21 in the housing 2.

At least a section of the transmission element 105 has a toothed rack 22 that interacts with a toothed wheel 23 on the motor shaft 13. The mechanics in this embodiment are somewhat less complicated, but there is greater overall frictional loss compared to the embodiments having an eccentric 14.

Figure 7:
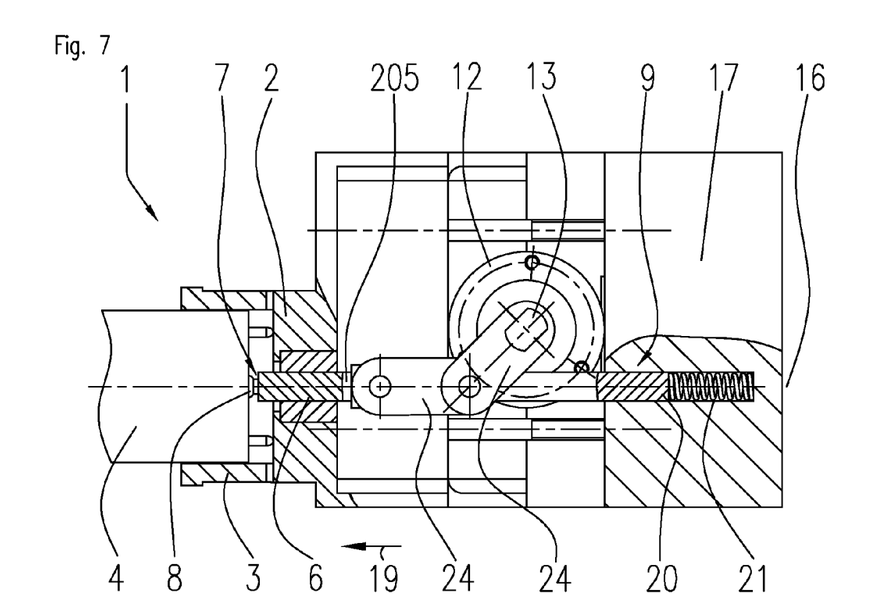
Figure 8:
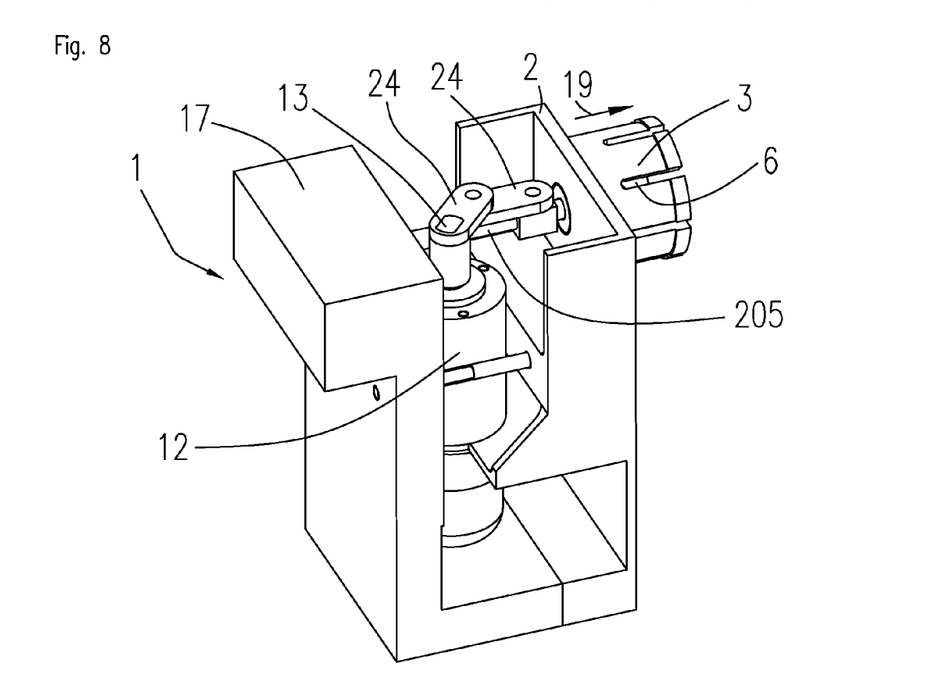

The embodiment of FIGS. 7 and 8 has a similar design to the embodiment of FIGS. 5 and 6. Here, instead of using the toothed rack 22 to transmit the movement, a jointed connecting rod 24 is fixed to the transmission element 205 and to the motor shaft 13. The rotation of the motor shaft 13 is thereby converted into a linear movement of the transmission pin 6.

Figure 9:
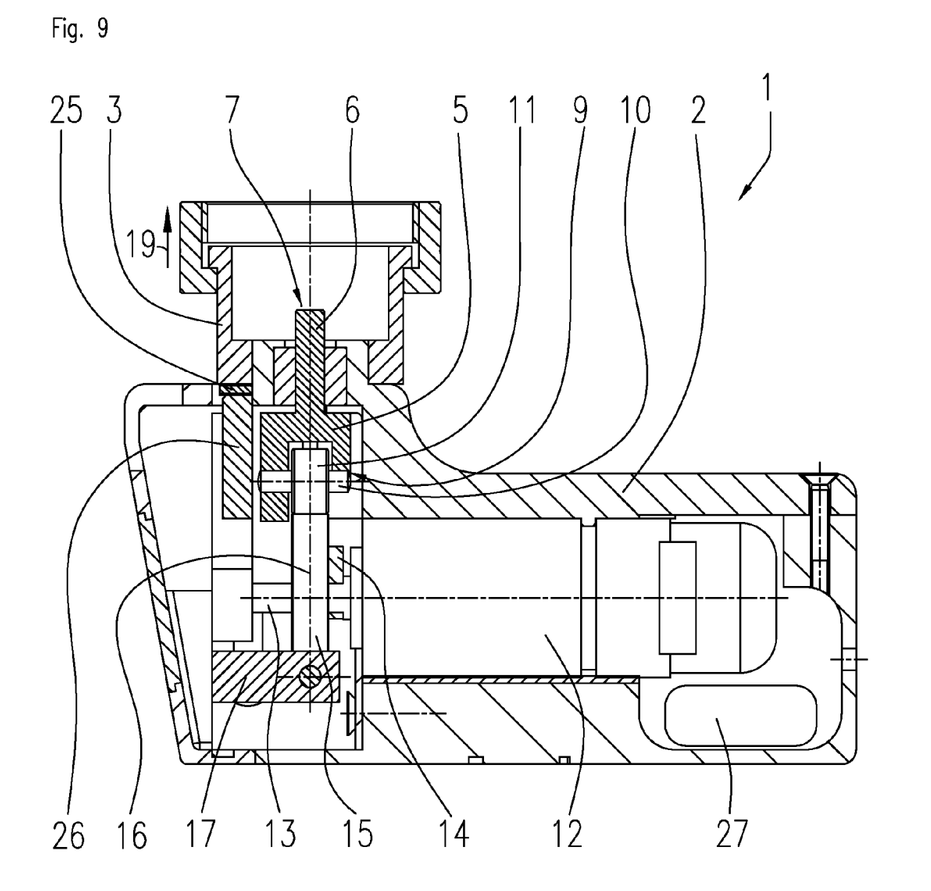

An advantageous development on the invention is shown in FIG. 9. This embodiment substantially corresponds to the embodiment of FIGS. 1B and 2. Here, the housing 2 is given a somewhat different shape, although this in no way influences the function.

As its power supply, however, this embodiment has a thermal energy converter 25 that converts thermal energy into electrical energy. To this end, the flange 3 used for mounting on the radiator valve 4 is preferably made of metal that allows the best possible conduction of heat from the radiator. The energy converter 25 is directly connected on one side to the flange 3 and, on the other side, to the heat sink 26. Since the energy converter 25 needs a flow of heat, the heat should flow through the energy converter 25 with the least possible obstruction. Moreover, the greatest possible difference in temperature is advantageous, which is why the heat sink 26 is made as large as possible.

The electrical energy generated in the energy converter is preferably stored in an energy storage unit 27, such as a rechargeable battery or a capacitor.

Since there is permanent heat in the radiator valve during heating, electrical energy can be constantly collected. Depending on the design of the energy converter 25, enough energy can be collected within a few minutes to enable the valve 4, for example, to be fully opened or closed. For short regulating distances, less time is accordingly required. For this purpose, a very small, low-cost energy converter is sufficient since, thanks to the economical drive according to the invention, only a small amount of energy is consumed.

This kind of radiator thermostat no longer needs an external source of energy and can thus be operated fully self-sufficiently and maintenance-free. Troublesome and expensive battery changes are no longer necessary.

Here, it has proven particularly advantageous to only permit a regulating movement, particularly to close the radiator valve, when sufficient energy remains in the storage unit to re-open the valve once more. In the open position, the thermal energy converter is again operative.

Crucial to the invention is that the transmission element is preloaded with a counter force F2 acting in opposition to the force F1 of the radiator valve and that the electric motor need then only provide the differential force dF in order to operate the valve.

Figure 10:
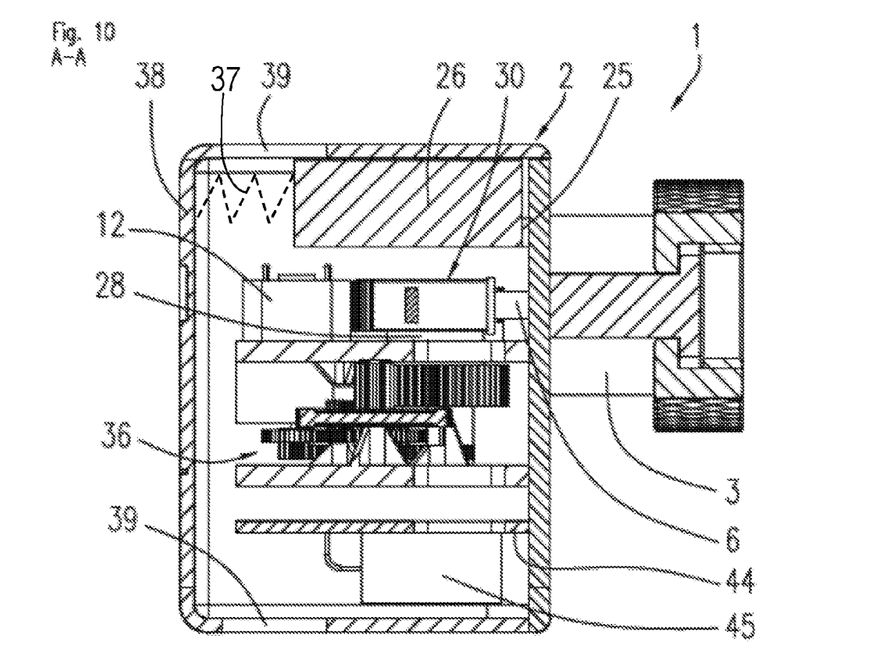

A further advantageous embodiment of the invention is shown in FIG. 10 whose construction is substantially the same as the embodiment of FIG. 9.

In this embodiment, the eccentric disk 14 is disposed on a shaft 28 that is driven by the electric motor 12. The inner ring 29 of an antifriction bearing 30 is disposed at the outside circumference of the eccentric disk 14. The antifriction bearing 30 may, for example, be a ball or needle bearing. The outer ring 31 of the antifriction bearing 30 acts directly on the transmission element 5, which, in this embodiment, only has a transmission pin 6. As it is shown in the example, the pin can exhibit a head in order to enlarge the contact area with the outer ring 30 of the antifriction bearing 30. The antifriction bearing 30 is moreover preloaded in the direction of the transmission element 5 by means of a spring. This preload can be effected, for example, using a compression or tension spring.

Figure 11:
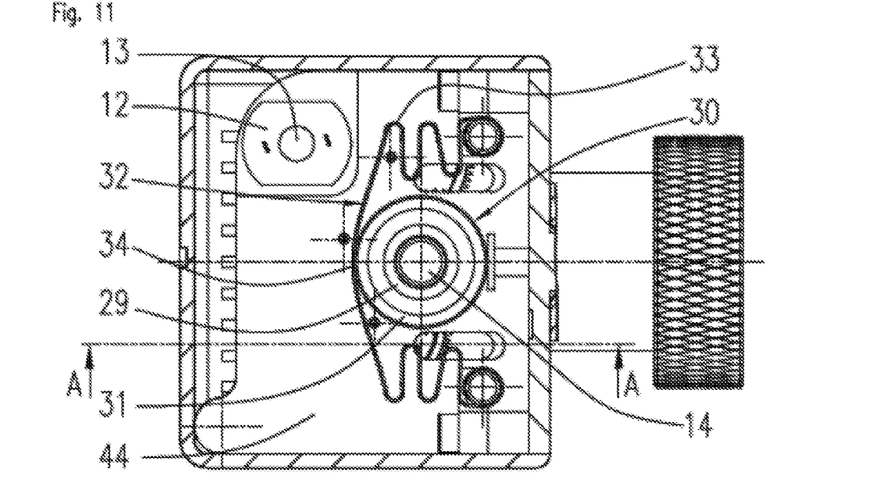
Figure 12:
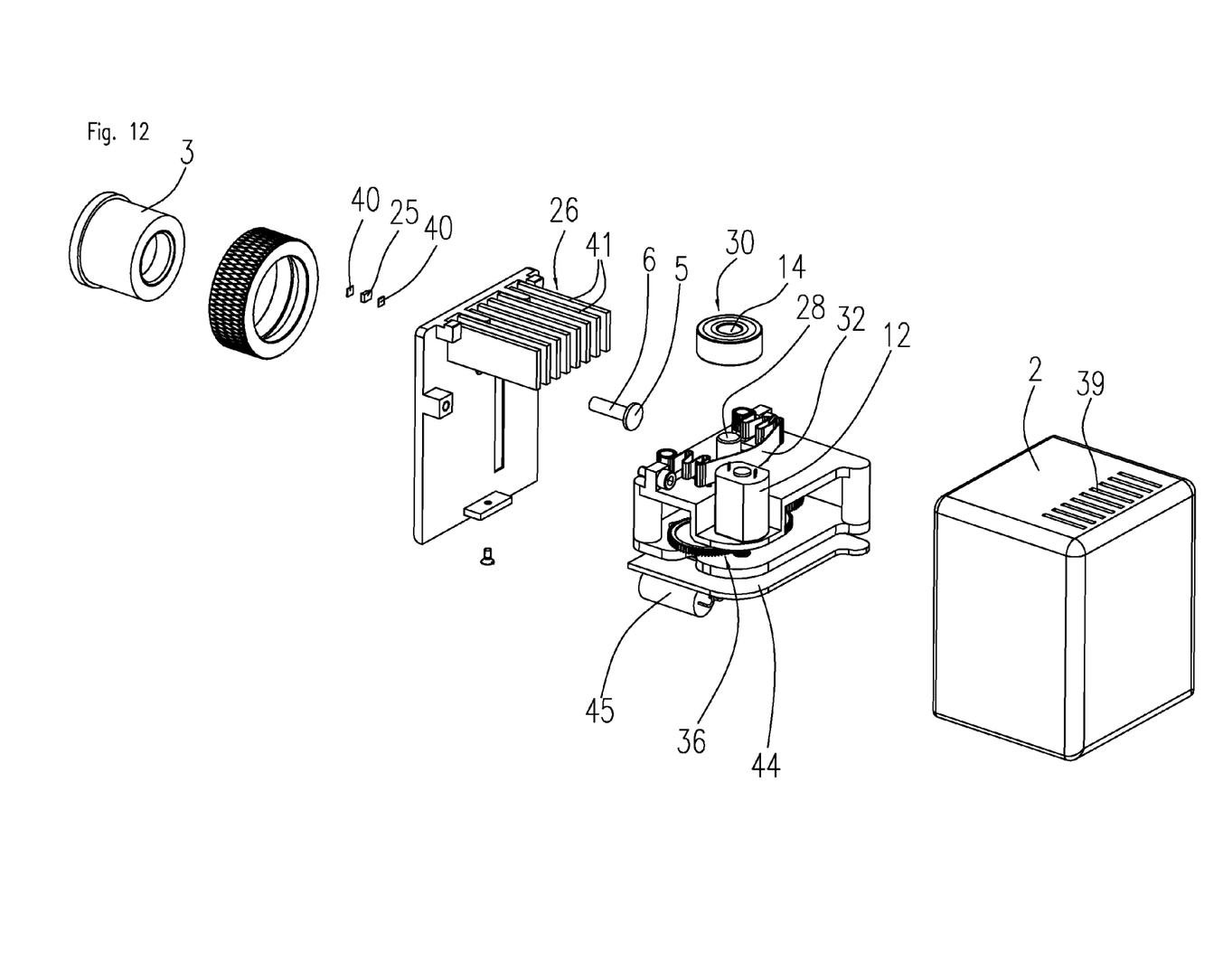
Figure 13:
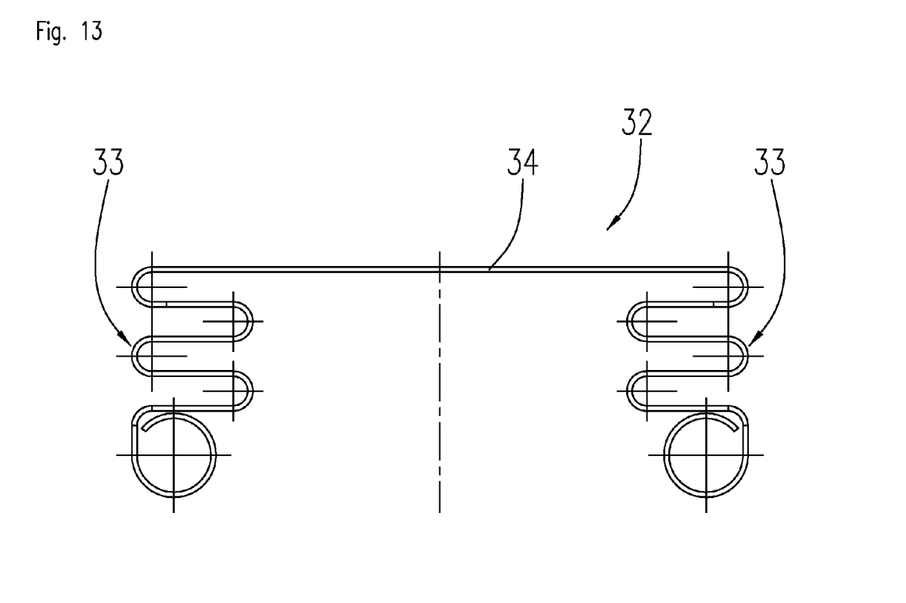

In the example, the preload is effected using a one-piece, substantially U-shaped tension spring 32 whose legs 33 are attached to the side of the transmission element 5 while the base 34 is led around the outer ring 31 of the antifriction bearing 30 and essentially engages directly opposite the transmission element 5 at the outer ring 31 (FIG. 11). The legs 33 are folded several times which goes to produce the spring effect. (FIGS. 12 and 13)

Instead of this one-piece spring 32, one or two differently shaped tension or compression springs may also act, for example, on a fixed bar that rests on the outer ring 31 of the antifriction bearing 30.

It is preferable if the eccentric disk 14 is not disposed directly on the motor shaft but rather on an output drive gear 35 of a reduction gear unit 36. This allows the motor 12 to be operated at higher rotational speed and lower torque.

Instead of the antifriction bearing 30, the transmission element may also interact with the bearing bush of a sliding bearing. The eccentric disk then acts as a shaft that is supported in the sliding bearing surface.

For its energy supply, this embodiment also has a thermoelectric energy converter 25 taking the form of a thermoelectric generator (TEG). This TEG 25 is seated between the flange 3 and a heat sink 26.

For it functioning, it is important that as much heat as possible flows through the TEG 25. The thermal resistance between the flange 3, the TEG 25 and the heat sink 26 should thus be as low as possible. Consequently, in this embodiment, the heat sink 26 is subjected to a further compression spring 37 that is seated between the housing wall 38 and the heat sink 26 and presses the heat sink 26 against the TEG 25.

In addition, a contact medium 40 is disposed between the TEG 25, the flange 3 and the heat sink 26, the contact medium 40 minimizing thermal resistance. This contact medium 40 may, for example, be a thermal paste. In the example the contact medium 40 is Indium.

Furthermore, it is advantageous if the difference in temperature between the flange 3 and the heat sink 26 is as large as possible. It is thus necessary for the heat conducted to the heat sink 26 to be led away from the housing 2 as effectively as possible. Hence, all the components in the housing 2 are disposed such that within the housing 2 there is a path open from the bottom to the top in which air can rise. For this purpose, appropriate ventilation vents 39 are provided in the housing 2.

This chimney effect causes a continuous flow of air through the housing 2, particularly past the heat sink 26. This allows the heat at the heat sink 26 to be continuously transported upwards out of the housing 2, which goes to improve the efficiency of the TEG 25.

Figure 14:
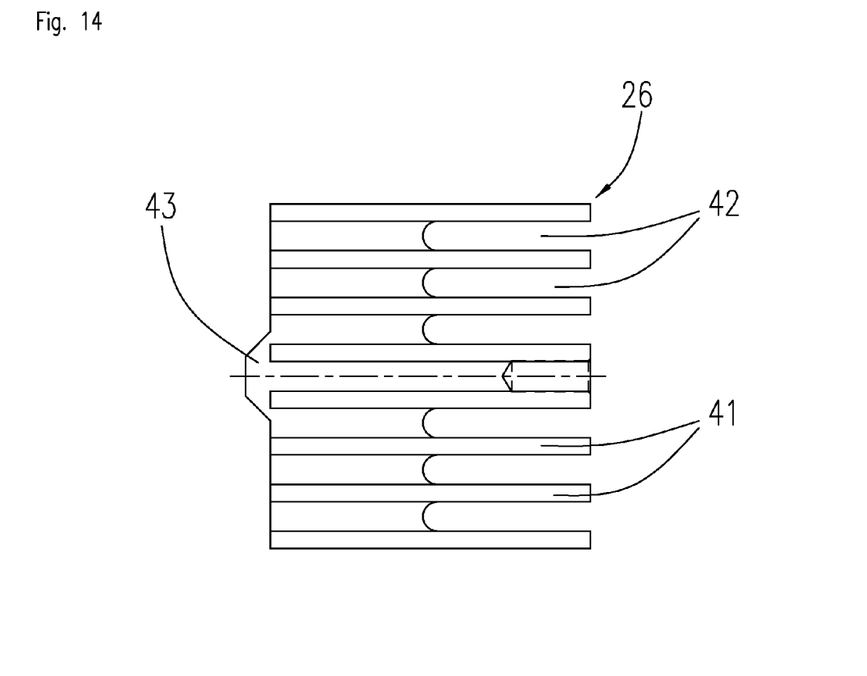

The heat sink 26 preferably has a plurality of cooling fins 41 that are at least partially free-standing, so that the current of air 43 created by the chimney effect flows through the slots 42 between the cooling fins 41 (FIG. 14) thus ensuring a more effective dissipation of heat. In addition, the heat sink 26 preferably has a projection acting as a contact point 43 for the TEG 25, so that the flow of heat is concentrated through the TEG 25. The projection furthermore acts as a spacer between the heat reservoir (heating circuit) and the cooling reservoir (cooling element), so that they are thermally insulated from one another and the greatest possible temperature gradient occurs along the thermo element. To intensify this effect, insulating material may additionally be placed between the warm side and the heat sink 26.

Alongside the TEG 25, the radiator thermostat 1 according to the invention may have an interface for externally charging an energy storage unit 27 that may, for example, be disposed on a circuit board 44. In the example, a battery is shown as the energy storage unit 27 although one or more capacitors or a combination of the two kinds of energy storage units may be used. Moreover, the radiator thermostat 1 may be configured via this interface, which is made possible by using, for example, USB, IEEE 1394 (FireWire), Thunderbolt or similar interfaces. Furthermore, the radiator thermostat 1 may have a wireless interface (e.g. ZigBee, Bluetooth, Bluetooth low energy, WLAN, Z-Wave) that can send measured data to a receiver and can receive control commands from a control device. This wireless interface, such as ZigBee or Z-Wave, is preferably optimized to low energy consumption. For this purpose it is activated, for example, at intervals for only a short period of time.

The radiator thermostat 1 monitors the surrounding temperature, the initial flow temperature in the radiator and the valve position so that it can be used directly for determining consumption. It is no longer necessary to determine consumption separately using evaporation tubes or suchlike. Determining consumption using the radiator thermostat 1 is much more accurate thanks to the precise sensor system.

Alongside the illustrated embodiments, there are a large number of other means of applying the preload to the transmission element, which is why the invention is in no way limited to these embodiments. In particular, by giving the mechanical parts a different design and thus a different construction, a compression spring could be substituted for a tension spring and vice versa.

To program and regulate the radiator thermostat, a variety of control methods can be provided. For one thing, the radiator thermostat can be provided with a display, such as an LC display, to display the operating status and the temperature. Within the control, provision can also be made for different operating statuses to be predetermined in different periods of time. To this end, the radiator thermostat contains a date/timer unit. The parameters are entered either using key functions that are realized on the radiator thermostat or using a remote control. The remote control can have a display as an alternative or in addition to the radiator thermostat.

All illustrated and non-illustrated embodiments can moreover be provided with at least one energy converter as the only or as an extra source of energy, thus allowing self-sufficient operation. The invention is not thereby limited to thermal energy converters.

IDENTIFICATION REFERENCE LIST

1 Radiator thermostat
2 Housing
3 Flange
4 Radiator valve
4' Valve seat
4" Valve disk
5 Transmission element
6 Transmission pin
7 Transmission pin free end
8 Valve pin
9 Transmission element inner end
10 First ball bearing axle
11 First ball bearing
12 Electric motor
13 Shaft
14 Eccentric disk
15 Second ball bearing
16 Longitudinal axis
17 Counter bearing
18 Tension spring
19 Direction of the valve
20 Compression spring
21 Recess
22 Toothed rack
23 Toothed wheel
24 Jointed connecting rod
25 Thermal energy converter
26 Heat sink
27 Energy storage unit
28 Shaft
29 Inner ring antifriction bearing 30 Antifriction bearing
31 Outer ring antifriction bearing
32 Tension spring
33 Leg
34 Base
35 Output drive gear
36 Reduction gear unit
38 Housing back wall
39 Ventilation vents
40 Contact medium
41 Cooling fins
42 Slots
43 Contact point
44 Circuit board
45 Energy storage unit
105 Transmission element
205 Transmission element
F1 Valve pin force
F2 Counter force
df Differential force

The invention claimed is:

1. A radiator thermostat to be fitted onto a radiator valve (4) comprising a transmission element (5, 105, 205) for transmitting a compressive force to the radiator valve (4), an electric motor (12) for driving the transmission element (5, 105, 205), a control for the electric motor (12), and a power supply comprising a thermoelectric energy converter (25) to convert thermal energy into electrical energy and an energy storage unit (27) to store the electrical energy, wherein the transmission element (5, 105, 205) is preloaded in a direction of the valve, and the control is configured to perform a regulating movement to close the radiator valve only when sufficient energy remains in the storage unit to later re-open the valve again.

2. The radiator thermostat according to claim 1, wherein the transmission element (5, 105, 205) is preloaded in the direction of the valve (19) using a spring (18; 20).

3. The radiator thermostat according to claim 1, wherein the transmission element (5) interacts with an outer ring (31) of an antifriction bearing (30) or with an outside circumference of a bearing bush of a sliding bearing, an inner ring (29) of the antifriction bearing (30) or a bearing surface of the sliding bearing is disposed at an outside circumference of an eccentric disk (14).

4. The radiator thermostat according to claim 3, wherein the outer ring (31) of the antifriction bearing (30) or the outside circumference of the bearing bush of the sliding bearing receives a force in the direction of the transmission element (5) via at least one spring (32).

5. The radiator thermostat according to claim 4, wherein the at least one spring (32) is formed as a substantially U-shaped tension spring having legs (33) that are folded more than two times and having a base (34) that is led around the outer ring (31) of the antifriction bearing (30) or around the outside circumference of the sliding bearing bush and rests against a side facing away from the transmission element (5).

* * * * *